United States Patent
Noda

(10) Patent No.: US 8,278,901 B2
(45) Date of Patent: Oct. 2, 2012

(54) SWITCHING REGULATOR CONFIGURED TO DETECT, AND COMPENSATE FOR, DECREASE IN OUTPUT VOLTAGE

(75) Inventor: Ippei Noda, Ikeda (JP)

(73) Assignee: Ricoh Company, Ltd., Tokyo (JP)

( * ) Notice: Subject to any disclaimer, the term of this patent is extended or adjusted under 35 U.S.C. 154(b) by 782 days.

(21) Appl. No.: 12/264,626

(22) Filed: Nov. 4, 2008

(65) Prior Publication Data

US 2009/0128116 A1    May 21, 2009

(30) Foreign Application Priority Data

Nov. 20, 2007  (JP) ................................. 2007-300645

(51) Int. Cl.
*G05F 1/00*  (2006.01)

(52) U.S. Cl. ........................................................ 323/284

(58) Field of Classification Search ........... 323/282–285
See application file for complete search history.

(56) References Cited

U.S. PATENT DOCUMENTS

| | | | |
|---|---|---|---|
| 6,922,042 B2 * | 7/2005 | Umemoto et al. | 323/283 |
| 7,508,176 B2 * | 3/2009 | Hartular et al. | 323/268 |
| 2005/0088159 A1 * | 4/2005 | Itohara | 323/284 |
| 2008/0012542 A1 * | 1/2008 | Liu et al. | 323/271 |
| 2008/0111530 A1 * | 5/2008 | Hasegawa et al. | 323/284 |

FOREIGN PATENT DOCUMENTS

| | | |
|---|---|---|
| CN | 101060283 A | 10/2007 |
| JP | 4-359675 | 12/1992 |
| JP | 5-292735 | 11/1993 |
| JP | 2002-281742 | 9/2002 |
| JP | 2005-45942 | 2/2005 |
| JP | 2006-280062 | 10/2006 |
| JP | 2007-236194 | 9/2007 |
| KR | 97-63894 | 12/1997 |
| WO | WO2007/129765 A1 | 11/2007 |

* cited by examiner

*Primary Examiner* — Adolf Berhane
*Assistant Examiner* — Jeffrey Gblende
(74) *Attorney, Agent, or Firm* — Cooper & Dunham LLP

(57) ABSTRACT

A switching regulator includes a switching element that switches between on and off according to a control signal, an inductor that is charged with the input voltage by switching of the switching element, a rectification element that discharges the inductor when the switching element is off and charging the inductor is stopped, a differential amplifier that amplifies a difference between a voltage proportional to the output voltage and a predetermined reference voltage, a voltage change detection circuit that detects changes in the output voltage, and a control circuit that causes the switching element to switch between on and off in a predetermined cycle depending on a voltage output from the differential amplifier. The control circuit turns on the switching element regardless of the predetermined cycle when the voltage change detection circuit detects that a decrease in the output voltage exceeds a predetermined first reference value.

18 Claims, 12 Drawing Sheets ures 901 B2

SWITCHING REGULATOR CONFIGURED TO DETECT, AND COMPENSATE FOR, DECREASE IN OUTPUT VOLTAGE

CROSS-REFERENCE TO RELATED APPLICATIONS

This patent specification is based on Japanese Patent Application No. 2007-300645, filed on Nov. 20, 2007 in the Japan Patent Office, the entire contents of which are hereby incorporated by reference herein.

BACKGROUND OF THE INVENTION

1. Technical Field

This disclosure generally relates to switching regulators for a whole category of electronic equipment installed in computerized personal organizers, handsets, voice recognition devices, voice memory devices, computers, etc.

2. Discussion of the Background

Current-mode switching regulators are widely used in portable electronic equipment, such as mobile phones, digital cameras, and the like. Currently, a switching frequency of the switching regulators is typically lowered while the electronic equipment is in a standby state in order to save energy.

FIG. 12 illustrates an example of circuitry of a known current-mode switching regulator, and FIG. 13 is a timing chart illustrating examples of waves of signals generated in the switching regulator shown in FIG. 12.

Referring to FIG. 12, a switching regulator 100 steps down an input voltage Vin input to an input terminal IN to a predetermined or given voltage and outputs an output voltage Vo from an output terminal OUT, while a detection circuit 101 converts an inductor electrical current i101 to voltage and outputs an electrical current detection voltage Vi. It is to be noted that hereinafter, electrical current is simply referred to as current.

The switching regulator 100 further includes an oscillator circuit 102, a RS (Reset Set) flip-flop circuit 103, a differential amplifier 104, a comparator 105, a reference voltage generation circuit 106, an inverter 107, an inductor L101, switching elements M101 and M102, an output capacitor C101, and a load 110. The switching element M102 is for synchronous rectification.

When the output voltage Vo decreases, a differential voltage Ve output from the differential amplifier 104 increases, which extends a time period required for a current detection voltage Vi to rise above the differential voltage Ve. Consequently, the switching element M101 is kept on for a longer time period, increasing the output voltage Vo. By contrast, when the output voltage Vo increases, the switching element M101 is kept on for a shorter time period, decreasing the output voltage Vo.

Thus, the output voltage Vo is adjusted to a predetermined or given voltage by controlling a time period during which the switching elements M101 and M102 are complementarily kept on and off according to changes in the output voltage Vo.

However, in known synchronous rectification switching regulators of current-mode control type such as the one shown in FIG. 12, when the output current io abruptly changes, the output voltage Vo significantly changes due to a delay in response of a feedback control system.

More specifically, referring to FIG. 13, when the output current io abruptly changes at a time point T0, the output capacitor C101 supplies electrical charge to the load 110 corresponding to the change in the output current io, and thus the output voltage Vo decreases. When the output voltage Vo decreases, a differential voltage Ve increases, and accordingly the switching element M101 is kept on for a longer time period. That is, although the switching element M101 is controlled to increase a peak value of the inductor current i101, the differential amplifier 104 fails to respond promptly due to a phase compensation circuit, etc., provided therein. Thus, the differential voltage Ve fails to change promptly, causing the output voltage Vo to decrease significantly.

When the output voltage Vo changes significantly, the output voltage Vo might decrease to below a specified operating range of the load 110 that is connected to the output terminal OUT, causing failure of the load 110.

To solve this problem, a known switching regulator includes a feed forward circuit that detects changes in the output current when the output voltage changes significantly, and the amount of the detected change in the output current is added to a detection signal of an inductor current. Thus, the inductor current can quickly change in response to the abrupt change in the output current, and accordingly fluctuations in the output voltage can be kept relatively small.

Another known switching regulator detects an abrupt change in the output voltage using a differential circuit that differentiates the output voltage with respect to time, and an output voltage from the differential circuit is added to a differential voltage generated by a differential amplifier so as to compensate for a delay in response of the differential amplifier, reducing fluctuations in the output voltage.

However, in the case of the switching regulator including the feed forward circuit described above, at least a current detector, such as a resistor, connected in series with the load, is required in order to detect changes in the output current.

Further, in either of the above-described switching regulators, when changes in the output voltage are detected while the switching element is off, countermeasures cannot be taken until the switching element is again turned on, causing a decrease in the output voltage.

In particular, when the electronic equipment is activated from the standby state, a load current can quickly increase from several micron amperes to several hundred amperes. However, because the switching frequency of the switching regulator is lowered while the electronic equipment is in the standby state as described above, it can take a relatively long time period from when the output voltage is decreased due to an increase in the output current to when the switching element is again turned on, causing the output voltage to decrease significantly.

In view of the foregoing, it is preferred to stabilize the output voltage immediately when detecting a decrease in the output voltage of a predetermined or given value or greater, which the known switching regulators fail to do.

BRIEF SUMMARY

In an aspect of this disclosure, there is provided a switching regulator that converts a voltage input to an input terminal thereof to a predetermined constant voltage and outputs an output voltage from an output terminal. The switching regulator includes a switching element configured to switch between on and off according to a control signal, an inductor configured to be charged with the input voltage by switching of the switching element, a rectification element configured to discharge the inductor when the switching element is off and charging the inductor is stopped, a differential amplifier configured to amplify a difference between a voltage proportional to the output voltage and a predetermined reference voltage, a voltage change detection circuit configured to detect changes in the output voltage, and a control circuit configured to control a time period during which the switching element is on or off by causing the switching element to switch between on and off in a predetermined cycle depending on a voltage output from the differential amplifier. The control circuit turns on the switching element regardless of the predetermined cycle when the voltage change detection circuit detects that a decrease in the output voltage exceeds a predetermined first reference value.

In another aspect, a switching regulator includes the switching element, the inductor, the rectification element, the differential amplifier, and the voltage change detection circuit described above, and the switching regulator further includes a control circuit configured to control a time period during which the switching element is on or off by causing the switching element to switch between on and off in a predetermined cycle depending on a voltage output from the differential amplifier, and an ancillary circuit that causes the switching element to turn on by adjusting the voltage output from the differential amplifier when the voltage change detection circuit detects that the decrease in the output voltage exceeds a first reference value.

BRIEF DESCRIPTION OF THE DRAWINGS

The aforementioned and other features, aspects and advantages would be better understood by reference to the following detailed description when considered in connection with the accompanying drawings, wherein.

DETAILED DESCRIPTION OF PREFERRED EMBODIMENTS

Figure 1:
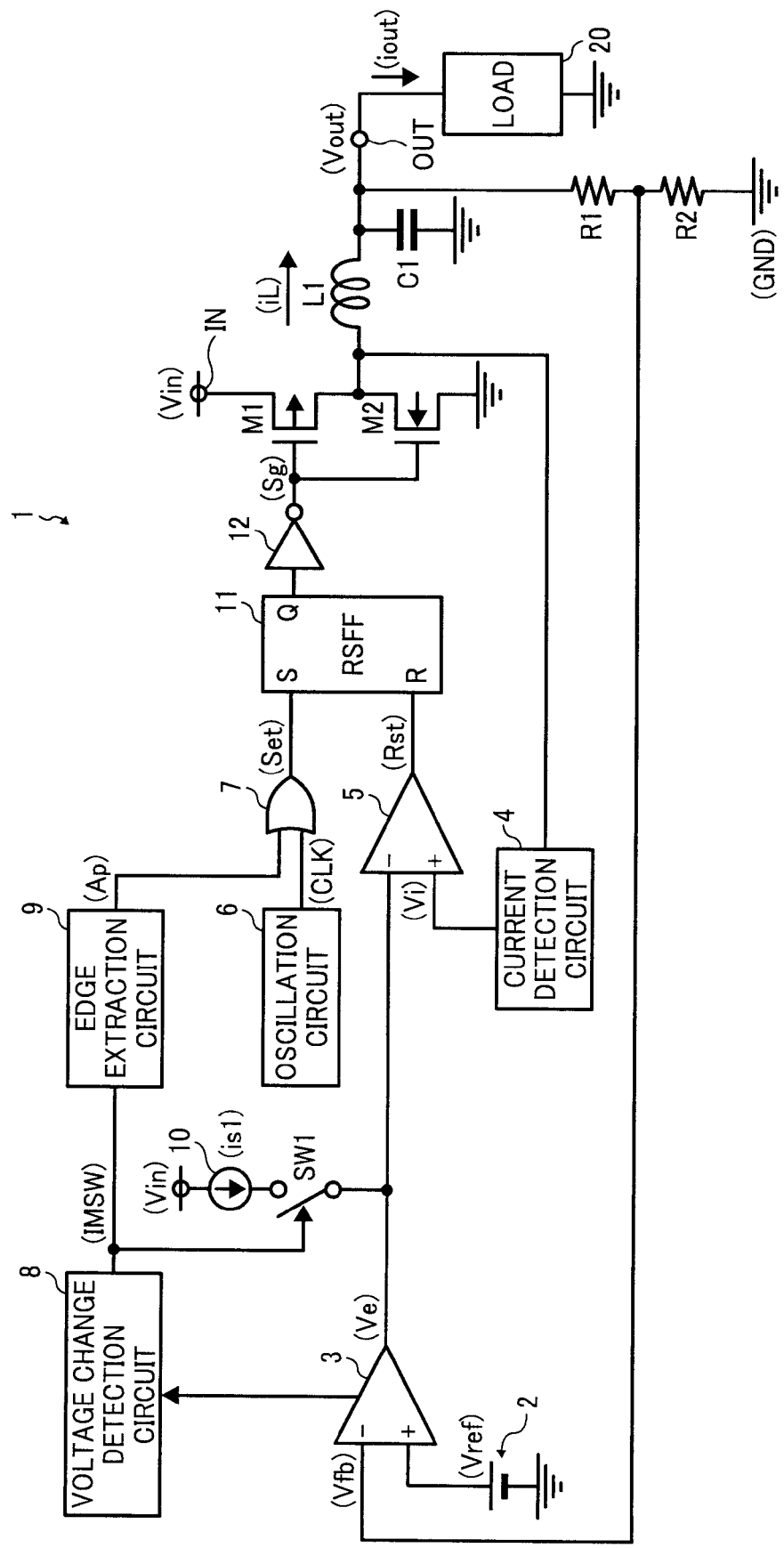
FIG. 1 illustrates an example of circuitry of a switching regulator according to an illustrative embodiment of the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve a similar result.

Referring now to the drawings, wherein like reference numerals designate identical or corresponding parts throughout the several views thereof, and particularly to FIG. 1, an example of a switching regulator according to an illustrative embodiment of the present invention is described. FIG. 1 illustrates an example of circuitry of a switching regulator 1 according to an illustrative embodiment of the present invention.

Referring to FIG. 1, the switching regulator 1 is a current-mode control type step-down switching regulator that steps down an input voltage Vin input to an input terminal IN to a predetermined or given constant voltage, and outputs an output voltage Vout from an output terminal OUT to a load 20.

The switching regulator 1 includes a switching transistor M1 that in the present embodiment is a PMOS (P-Channel Metal Oxide Semiconductor) transistor, a synchronous rectification transistor M2 that in the present embodiment is a NMOS (N-Channel Metal Oxide Semiconductor) transistor, an inductor L1, an output capacitor C1, and resistors R1 and R2 to detect the output voltage Vout using a partial voltage Vfb that is generated by dividing the output voltage Vout, and accordingly is proportional to the output voltage Vout. The switching transistor M1 switches between being on and off so as to adjust output of the input voltage Vin. The switching transistor M1 and synchronous rectification transistor M2 serve as a switching element and a rectification element, respectively.

The switching regulator 1 further includes a reference voltage generation circuit 2 to generate a predetermined or given reference voltage Vref, a differential amplifier 3, a current detection circuit 4 to detect an inductor current iL flowing through the inductor L1 and convert it to voltage, and a comparator 5. The differential amplifier 3 compares the partial voltage Vfb with the reference voltage Vref and generates a differential voltage Ve by amplifying the difference in voltage. The comparator 5 compares a current detection voltage Vi that is output from the current detection circuit 4 with the differential voltage Ve.

The switching regulator 1 further includes a oscillator circuit 6 that outputs a predetermined or given clock signal CLK, an OR circuit 7 that outputs a set pulse signal Set, a voltage change detection circuit 8, an edge extraction circuit 9, a constant current source 10, a switch SW1 serving as a switch member, a Reset Set (RS) flip-flop circuit 11, and an inverter 12. The RS flip-flop circuit 11 is set with the signal Set output from the OR circuit 7 and reset with a reset pulse signal Rst output from the comparator 5. The inverter 12 inverts the level of a signal output from a non-inversion output terminal Q of the RS flip-flop circuit 11.

The constant current source 10 and the switch SW1 serve as an ancillary circuit. The current detection circuit 4, the comparator 5, the oscillation circuit 6, the OR circuit 7, the edge extraction circuit 9, the RS flip-flop circuit 11, and the inverter 12 serve as a control circuit.

It is to be noted that the respective circuits of the switching regulator 1 except the inductor L1 and the capacitor C1 can be integrated into an integrated circuit (IC). Alternatively, the respective circuits of the switching regulator 1 except at least one of the switching transistor M1, the synchronous rectification transistor M2, the inductor L1, and the output capacitor C1 can be integrated into an IC.

The switching transistor M1 and the synchronous rectification transistor M2 are connected in series between the input terminal IN and a ground voltage. The inductor L1 is connected between the output terminal OUT and a junction node between the switching transistor M1 and the synchronous rectification transistor M2. The resistors R1 and R2 are connected in series between the output terminal OUT and a ground voltage, and the output capacitor C1 is connected in parallel with this series circuit between the output terminal OUT and a ground voltage. An inversion input terminal of the differential amplifier 3 serves as a first input terminal to which the partial voltage Vfb at a junction node between the resistors R1 and R2 is input, and a non-inversion input terminal thereof serves as a second input terminal to which the reference voltage Vref is input. The differential voltage Ve is input to an inversion input terminal of the comparator 5, and the current detection voltage Vi is input to a non-inversion input terminal thereof.

The constant current source 10 and the switch SW1 are connected in series between the input voltage Vin and a junction node between an output terminal of the differential amplifier 3 and the inversion input terminal of the comparator 5. An output signal from the differential amplifier 3 is input to the voltage change detection circuit 8. The voltage change detection circuit 8 detects changes in the output voltage Vout according to that signal, generates a signal IMSW indicating a result of the detection, and outputs the signal IMSW to both a control electrode of the switch SW1 and the edge extraction circuit 9. The edge extraction circuit 9 detects a rising edge of the signal IMSW, generates a signal Ap indicating a result of the detection, and outputs the signal Ap to one of input terminals of the OR circuit 7.

The predetermined clock signal CLK transmitted from the oscillation circuit 6 is input to the other input terminal of the OR circuit 7, and the set pulse signal Set transmitted from the OR circuit 7 is input to a set input terminal S of the RS flip-flop circuit 11. A reset input terminal R of the RS flip-flop circuit 11 receives the reset pulse signal Rst transmitted from the comparator 5. The signal output from the non-inversion output terminal Q thereof and whose level is inverted by the inverter 12 is input to a gate of the switching transistor M1 and a gate of the synchronous rectification transistor M2 as a signal Sg.

Operation of the switching regulator 1 is described below with reference to FIGS. 1 and 2.

Figure 2:
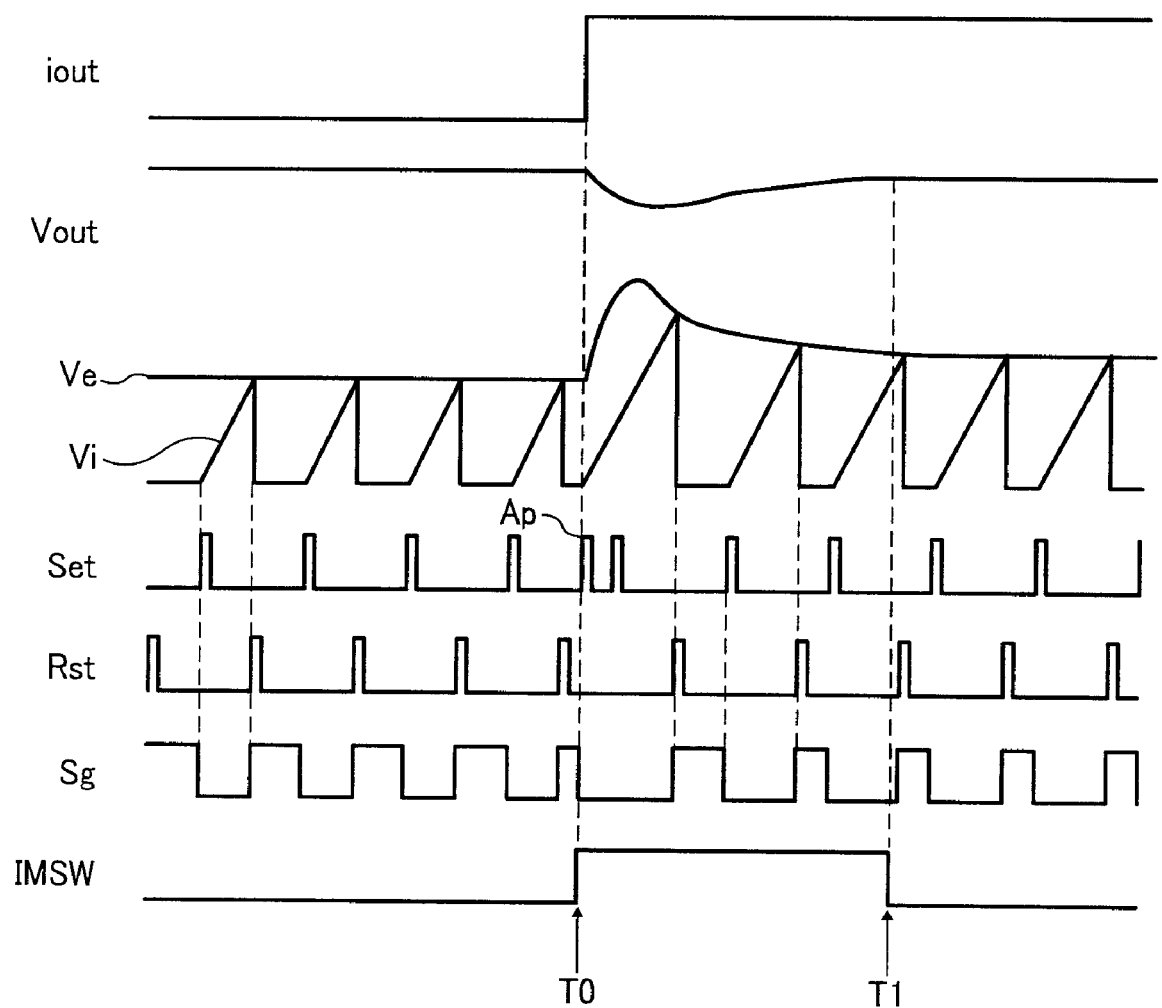
FIG. 2 is a timing chart illustrating examples of waves of respective signals generated in the switching regulator shown in FIG. 1.

FIG. 2 is a timing chart illustrating examples of waves of the respective signals generated in the switching regulator 1 shown in FIG. 1.

The differential amplifier 3 generates a signal indicating the difference between the partial voltage Vfb and the reference voltage Vref (hereinafter "voltage difference signal"), and then amplifies the voltage difference signal so as to generate the differential voltage Ve as well as output this signal to the voltage change detection circuit 8.

The comparator 5 compares the differential voltage Ve with the current detection voltage Vi transmitted from the current detection circuit 4, generates the reset pulse signal Rst indicating the result of the comparison, and inputs the reset pulse signal Rst to the reset input terminal R of the RS flip-flop circuit 11.

The voltage change detection circuit 8 amplifies the voltage difference signal indicating the difference between the partial voltage Vfb and the reference voltage Vref, that is, the voltage (voltage difference signal) output from the differential amplifier 3, more quickly than the differential amplifier 3 does, and outputs the amplified voltage difference signal. The voltage change detection circuit 8 sets the signal IMSW to high when the amplified voltage difference signal exceeds a predetermined or given voltage and low when that signal does not exceed the predetermined voltage.

The edge extraction circuit 9 detects the rising edge of the signal IMSW when this signal rises to high, and outputs the signal Ap that is a pulse signal having a predetermined or given pulse width. The OR circuit 7 outputs the clock signal CLK to the set input terminal S of the RS flip-flop circuit 11 as the set pulse Set when the signal Ap is low, that is, when the signal IMSW is low or after a predetermined or given time period has passed after the rising edge of the signal IMSW is detected. Further, when the signal Ap is high, that is, until the predetermined time period has passed after the rising edge of the signal IMSW is detected, the OR circuit 7 outputs a high-level signal thereto as the set pulse Set.

When the current detection voltage Vi is identical to or lower than the differential voltage Ve, the reset pulse signal Rst output from the comparator 5 is low. In this case, the RS flip-flop circuit 11 outputs a high level signal from the non-inversion output terminal Q when the set pulse signal Set output from the OR circuit 7 is high and a low level signal when the set pulse signal Set is low.

When the RS flip-flop circuit 11 outputs the high level signal from the non-inversion output terminal Q, a low level signal Sg is input to the gate of each of the switching transistor M1 and the synchronous rectification transistor M2, turning on the switching transistor M1 to be conductive as well as turning off the synchronous rectification transistor M2 to be insulated. Accordingly, the input voltage Vin is applied to a series circuit including the inductor L1 and the output capacitor C1, and thus the inductor current iL increases linearly over time, increasing the current detection voltage Vi from the current detection circuit 4 linearly. When the inductor current iL exceeds the output current iout, the output capacitor C1 stores electrical charge, increasing the output voltage Vout.

By contrast, when RS flip-flop circuit 11 outputs a low level signal from the non-inversion output terminal Q, a high level signal Sg is input to the gate of each of the switching transistor M1 and the synchronous rectification transistor M2, turning off the switching transistor M1 as well as turning on the synchronous rectification transistor M2. Accordingly, the energy stored in the inductor L1 is discharged, and thus the inductor current iL decreases linearly over time. When the inductor current iL decreases to below the output current iout, electricity is supplied from the output capacitor C1 to the load 20, decreasing the output voltage Vout.

When the current detection voltage Vi exceeds the differential voltage Ve, the comparator 5 outputs a high level reset pulse signal Rst so as to reset the RS flip-flop circuit 11. The RS flip-flop circuit 11 keeps the non-inversion output terminal Q low regardless of the level of the set pulse signal Set while receiving the high level reset pulse signal Rst, and thus the operation described above is performed, decreasing the output voltage Vout.

Because the differential voltage Ve output from the differential amplifier 3 increases as the output voltage Vout decreases, it takes a longer time period for the current detection voltage Vi to rise above the differential voltage Ve. Accordingly, the switching transistor M1 is on for a longer time period, increasing the output voltage Vout. By contrast, when the output voltage Vout increases, the switching transistor M1 is on for a shorter time period, decreasing the output voltage Vout.

Thus, the output voltage Vout can be kept at a predetermined or given voltage by complementarily controlling the time period during which the switching transistor M1 and the synchronous rectification transistor M2 are on or off depending on changes in the output voltage Vout.

Here, while the decrease in the output voltage Vout is less than a predetermined or given first reference amount, the CLK signal is input to the set input terminal of the RS flip-flop circuit 11 via the OR circuit 7 as the signal Set with a predetermined or given cycle, and accordingly the switching transistor M1 is turned on and off with the predetermined cycle. However, when the output current iout significantly increases at the time point T0 shown in FIG. 2, the output voltage Vout decreases. The voltage change detection circuit 8 quickly amplifies changes in the output voltage Vout according to the signal input from the differential amplifier 3, and turns the output signal IMSW high when the output voltage Vout has changed by the first reference amount or greater. It is to be noted that hereinafter the first reference amount is also referred to as the first reference value.

When the signal IMSW is thus turned to high, the edge extraction circuit 9 extracts the edge of the high level signal IMSW, and then outputs the high level signal Ap whose pulse is relatively short. This high level signal Ap is input to the set input terminal S of the RS flip-flop circuit 11 via the OR circuit 7. Subsequently, the RS flip-flop circuit 11 turns the non-inversion output terminal Q high, turning on the switching transistor M1 as well as turning off the synchronous rectification transistor M2.

In other words, when the output current iout rapidly increases and then the output voltage Vout decreases by the first reference amount or greater, the switching transistor M1 can be turned on regardless of the clock signal CLK output from the oscillation circuit 6, that is, the predetermined cycle. Consequently, the output voltage Vout quickly increases to compensate for the decrease, preventing a significant decrease in the output voltage Vout.

Further, because the switch SW1 is turned on when the signal IMSW rises to high, a constant current is1 is supplied from the constant current source 10 to the output terminal of the differential amplifier 3, which rapidly increases the differential voltage Ve. Accordingly, the response speed of the differential amplifier 3 can be accelerated, and the switching transistor M1 can be kept on for a longer time period, further reducing the decrease in the output voltage Vout.

When the output voltage Vout is stabilized, the signal IMSW output from the voltage change detection circuit 8 shifts to low at a time point T1. Then, the signal Ap shifts to low, and accordingly the OR circuit 7 outputs the set signal to the RS flip-flop circuit 11 in synchronization with the signal CLK. Thus, the operation to turn on the switching transistor M1 regardless of the predetermined cycle is cancelled.

It is to be noted that, although the description above concerns an example of both preventing or reducing decrease in the output voltage Vout using the pulse signal Ap and increasing the differential voltage Ve output from the differential amplifier 3, alternatively, the same or similar effect of stabilizing the output voltage Vout can be attained when only one of the countermeasures is performed. In this case, the OR circuit 7 and the edge extraction circuit 9 can be omitted, inputting the clock signal CLK directly to the set input terminal S of the RS flip-flop circuit 11. Alternatively, the constant current source 10 and the switch SW1 can be omitted.

Figure 3:
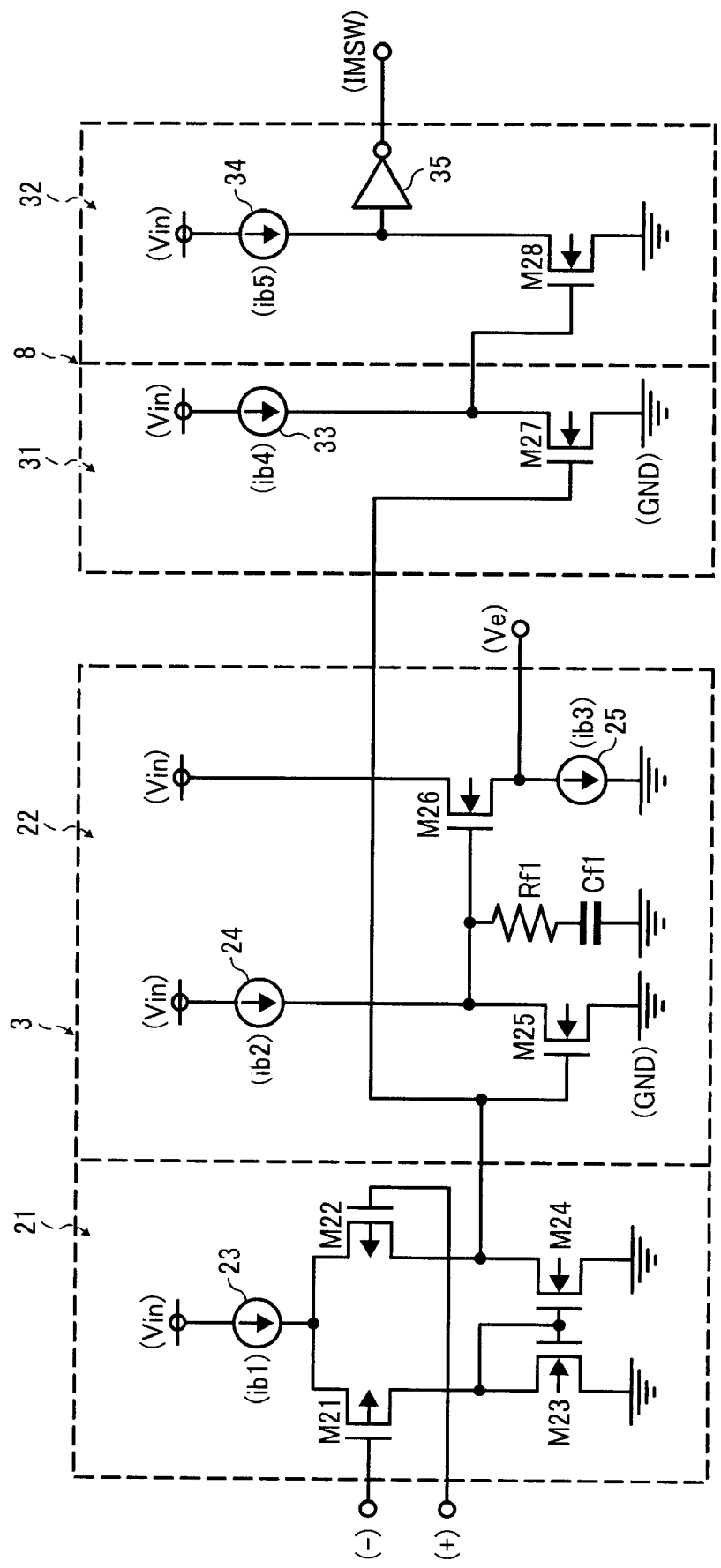
FIG. 3 illustrates examples of circuitry of a differential amplifier and a voltage change detection circuit shown in FIG. 1.

FIG. 3 illustrates an example of circuitry of the differential amplifier 3 and the voltage change detection circuit 8.

As shown in FIG. 3, the differential amplifier 3 includes a differential unit 21 (first stage) and an amplifier unit 22 (second stage). The differential unit 21 includes PMOS transistors M21 and M22 forming a differential pair, NMOS transistors M23 and M24, and a constant current source 23 that supplies the differential pair with a predetermined or given bias current ib1. The NMOS transistors M23 and M24 form a current mirror circuit that serves as a load for the differential pair.

The amplifier unit 22 includes NMOS transistors M25 and M26, a resistor Rf1, a capacitor Cf1, and constant current sources 24 and 25. The constant current sources 24 and 25 generate and output predetermined or given constant currents ib2 and ib3, respectively.

Sources of the PMOS transistors M21 and M22 are connected, and the constant current source 23 is connected between the input voltage Vin and a junction node between the sources thereof. The NMOS transistor M23 is connected between a drain of the PMOS transistor M21 and a ground voltage. The NMOS transistor M24 is connected between a drain of the PMOS transistor M22 and a ground voltage. A junction node between the drain of the PMOS transistor M22 and the NMOS transistor M24 serves as an output terminal of the differential unit 21 from which the voltage difference signal is output to the amplifier unit 22. Gates of the NMOS transistors M23 and M24 are connected, and a junction node therebetween is connected to a drain of the NMOS transistor M23. A gate of the PMOS transistor M21 serves as the inversion input terminal (first input terminal) of the differential amplifier 3 to which partial voltage Vfb is input, and a gate of the PMOS transistor M22 serves as the non-inversion input terminal (second input terminal) thereof to which the reference voltage Vref is input.

In the amplifier unit 22, the constant current source 24 is connected between the input voltage Vin and a drain of the NMOS transistor M25. A source of the NMOS transistor M25 is connected to a ground voltage, and a gate thereof is connected to the output terminal of the differential unit 21. A junction node between the constant current source 24 and the NMOS transistor M25 is connected to a gate of the NMOS transistor M26, and a serial circuit including the resistor Rf1 and the capacitor Cf1 is connected between the gate of the NMOS transistor M26 and a ground voltage. Further, a drain of the NMOS transistor M26 is connected to the input voltage Vin, and the constant current source 25 is connected between a source of the NMOS transistor M26 and a ground voltage. A junction node between the NMOS transistor M26 and the constant current source 25 serves as the output terminal of the differential amplifier 3 from which the differential voltage Ve is output.

Although the amplifier unit 22 of the differential amplifier 3 includes the NMOS transistors M25 and M26 as described above, because the NMOS transistor 26 forms a source follower circuit, a gain thereof is identical or similar to 1. Accordingly, a gain of the amplifier unit 22 is obtained by an amplifier circuit of the NMOS transistor 25 whose source is grounded. The serial circuit including the resistor Rf1 and the capacitor Cf1 compensates for a phase of the differential amplifier 3.

The voltage change detection circuit 8 includes a signal amplifier unit 31 that amplifies the voltage difference signal (voltage) output from the differential unit 21 and outputs the amplified voltage difference signal, and a binarization unit 32 that outputs the signal IMSW by binarizing the amplified voltage difference signal output from the signal amplifier unit 31.

The signal amplifier unit 31 includes a constant current source 33 that generates and outputs a predetermined constant current ib4, and a NMOS transistor M27. The binarization unit 32 includes a constant current source 34 that generates and outputs a predetermined constant current ib5, a NMOS transistor M28, and an inverter 35.

The constant current source 33 is connected between the input voltage Vin and a drain of the NMOS transistor M27. A source of the NMOS transistor M27 is connected to a ground voltage, and a gate thereof is connected to the output terminal of the differential unit 21 of the differential amplifier 3. A junction node between the constant current source 33 and the NMOS transistor M27 serves as an output terminal of the signal amplifier unit 31.

In the binarization unit 32, the constant current source 34 is connected between the input voltage Vin and a drain of the NMOS transistor M28. A source of the NMOS transistor M28 is connected to a ground voltage, and a gate thereof is connected to the output terminal of the signal amplifier unit 31. A junction node between the constant current source 34 and the NMOS transistor M28 is connected to an input terminal of the inverter 35, and an output terminal thereof serves as an output terminal of the binarization unit 32 as well as the output terminal of the voltage change detection circuit 8 that outputs the signal IMSW.

The signal amplifier unit 31 amplifies the voltage output from the differential unit 21 that is the first stage of the differential amplifier 3, and has a threshold voltage smaller than that of the NMOS transistor M25. Accordingly, the signal amplifier unit 31 has a gain smaller than that of the amplifier unit 22 including the NMOS transistor M25.

However, in the differential amplifier 3, the resistor Rf1 and the capacitor Cf1 for performing phase compensation are serially connected between the gate of the NMOS transistor M26 and the ground voltage, and accordingly the response speed is slower. By contrast, because such a circuit is unnecessary in the signal amplifier unit 31, the response speed and a slew rate thereof are faster than those of the differential amplifier 3.

In the voltage change detection circuit 8 described above, when the amount of the change in the output voltage Vout is smaller than the first reference value, a drain voltage of the NMOS transistor M28 does not decrease to below the threshold voltage of the inverter 35, and thus the output signal IMSW is kept at low. By contrast, when the output voltage Vout changes by the first reference amount or greater, impedance of the NMOS transistor M27 increases, which increases a gate voltage of the transistor M28. Consequently, the drain voltage of the NMOS transistor M28 decreases to below the threshold voltage of the inverter 35, and then the inverter 35 inverts the level of the signal IMSW, outputting the high level signal IMSW.

An amount of the change (that is, an increase or decrease) in the output voltage Vout with which the level of the signal IMSW is inverted is identical or similar to a voltage obtained by dividing a difference between the threshold voltages of the NMOS transistors M25 and M27 by the gain of the differential unit 21. For example, when the difference between the thresholds voltages is 30 mV, and the gain of the differential unit 21 is 10, the signal IMSW is turned to high with a decrease in the output voltage Vout of 3 mV.

Figure 4:
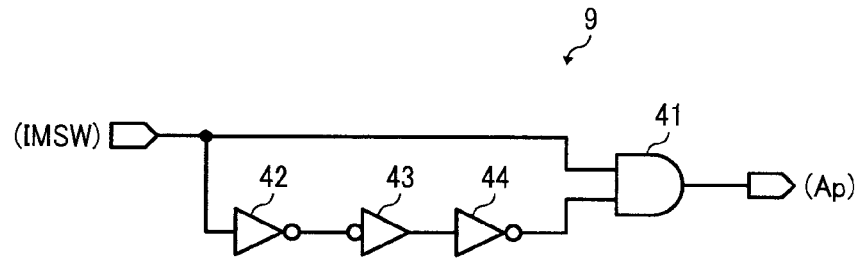
FIG. 4 illustrates an example of circuitry of an edge extraction circuit shown in FIG. 1.

FIG. 4 illustrates an example of circuitry of the edge extraction circuit 9 shown in FIG. 1.

As shown in FIG. 4, the edge extraction circuit 9 includes an AND circuit 41, and inverters 42, 43, and 44. The AND circuit 41 has a first input terminal to which the signal IMSW output from the voltage change detection circuit 8 is input and a second input terminal to which the signal IMSW is input via a serial circuit including the inverters 42, 43, and 44. An output terminal of the AND circuit 41 serves as the output terminal of the edge extraction circuit 9 that outputs the signal Ap.

When the signal IMSW is low, the first input terminals of the AND circuit 41 is low and the level of the signal IMSW input to the second input terminal thereof is inverted to high, and thus the signal Ap output from the AND circuit 41 is low. By contrast, when the signal IMSW rises to high, because the first input terminal of the AND circuit 41 rises to high, the signal Ap output from the AND circuit 41 rises to high. However, when a delay caused by the inverters 42, 43, and 44 has passed, the signal IMSW whose level is inverted to low is input to the second input terminal thereof, which causes the signal Ap to shift to low.

In other words, when the signal IMSW rises to high, the edge extraction circuit 9 outputs as the signal Ap a high-level short pulse signal whose pulse width is determined by the delay caused by the inverters 42, 43, and 44.

It is to be noted that, although the description above concerns an example using three inverters, any uneven number of inverters connected serially can be used in the edge extraction circuit 9.

Figure 5:
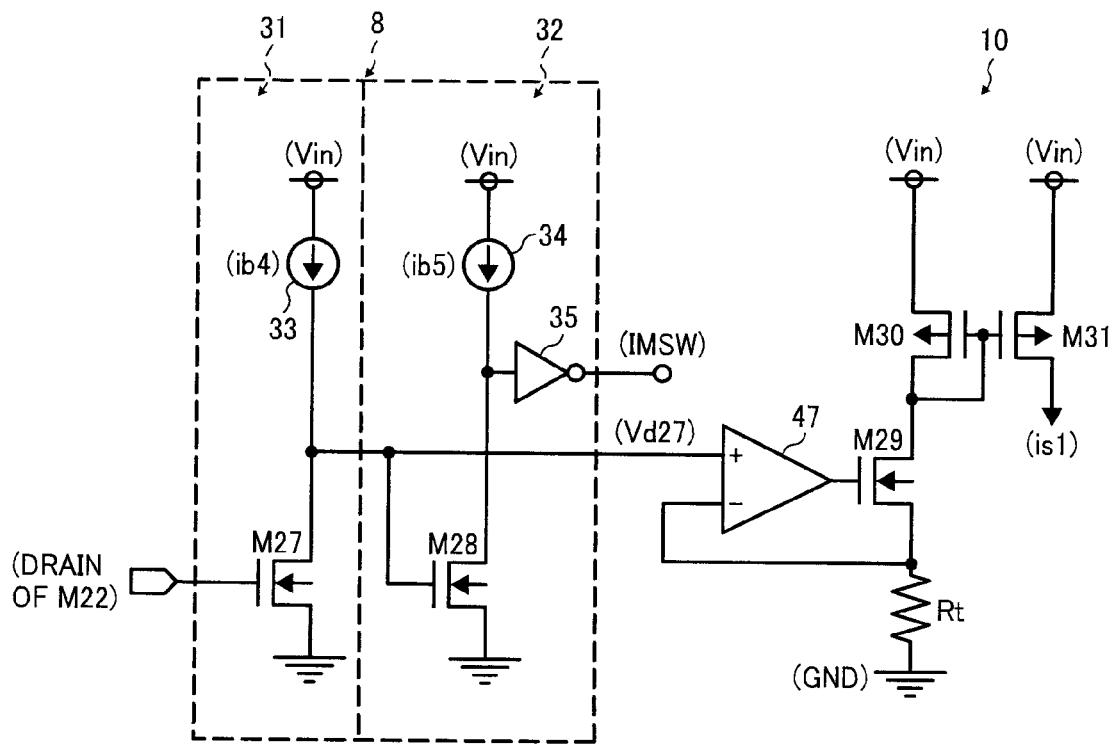
FIG. 5 illustrates an example of circuitry of a constant current source shown in FIG. 1.

FIG. 5 illustrates an example of circuitry of the constant current source 10 shown in FIG. 1.

As shown in FIG. 5, the constant current source 10 includes a computation amplifier circuit 47, an NMOS transistor M29, PMOS transistors M30 and M31 forming a current mirror circuit, and a resistor Rt. A voltage Vd27 (amplified voltage difference signal) output from the signal amplifier unit 31 is input to a non-inversion input terminal of the computation amplifier circuit 47. An output terminal of thereof is connected to a gate of the NMOS transistor 29.

The resistor Rt is connected between a source of the NMOS transistor M29 and a ground voltage, and a junction node between the NMOS transistor M29 and the resistor Rt is connected to an inversion input terminal of the computation amplifier circuit 47. Sources of the PMOS transistors M30 and M31 are respectively connected to the input voltage Vin, gates thereof are connected to each other, and a junction node therebetween is connected to a drain of the PMOS transistor M30. The drains of the PMOS transistor M30 and that of the NMOS transistor M29 are connected to each other, and a constant current is2 is output from a drain of the PMOS transistor M31.

The computation amplifier circuit 47 adjusts a gate voltage of the NMOS transistor M29 so as to set a source voltage of the NMOS transistor M29 identical or similar to the voltage Vd27 (drain voltage of the NMOS transistor M27). Accordingly, when the resistor Rt has a resistance value rt, a drain current of the NMOS transistor M29 can be expressed as Vd27/rt. The drain current of the NMOS transistor M29 is output as the constant current is1 from the drain of the PMOS transistor M31 via the current mirror circuit formed by the PMOS transistors M30 and 31.

In other words, the value of the constant current is1 is proportional to the voltage Vd27 output from the signal amplifier unit 31, and thus a variable voltage corresponding to the voltage Vd27 output from the signal amplifier unit 31 is added to the differential voltage Ve output from the differential amplifier 3. As the voltage Vd27 is generated by amplifying the voltage difference signal output from the differential unit 21, the voltage output from the differential amplifier 3 is changed by the amount corresponding to the voltage output from differential unit 21 when the voltage change detection circuit 8 detects that the decrease in the output voltage Vout exceeds the first reference value.

It is to be noted that, although the constant current is1 output from the constant current source 10 is supplied to the output terminal of the differential amplifier 3 in the description above, alternatively, the constant current is1 can be supplied to the gate of the NMOS transistor M26 included in the amplifier unit 22 of the differential amplifier 3, which is described with reference to FIG. 6.

Figure 6:
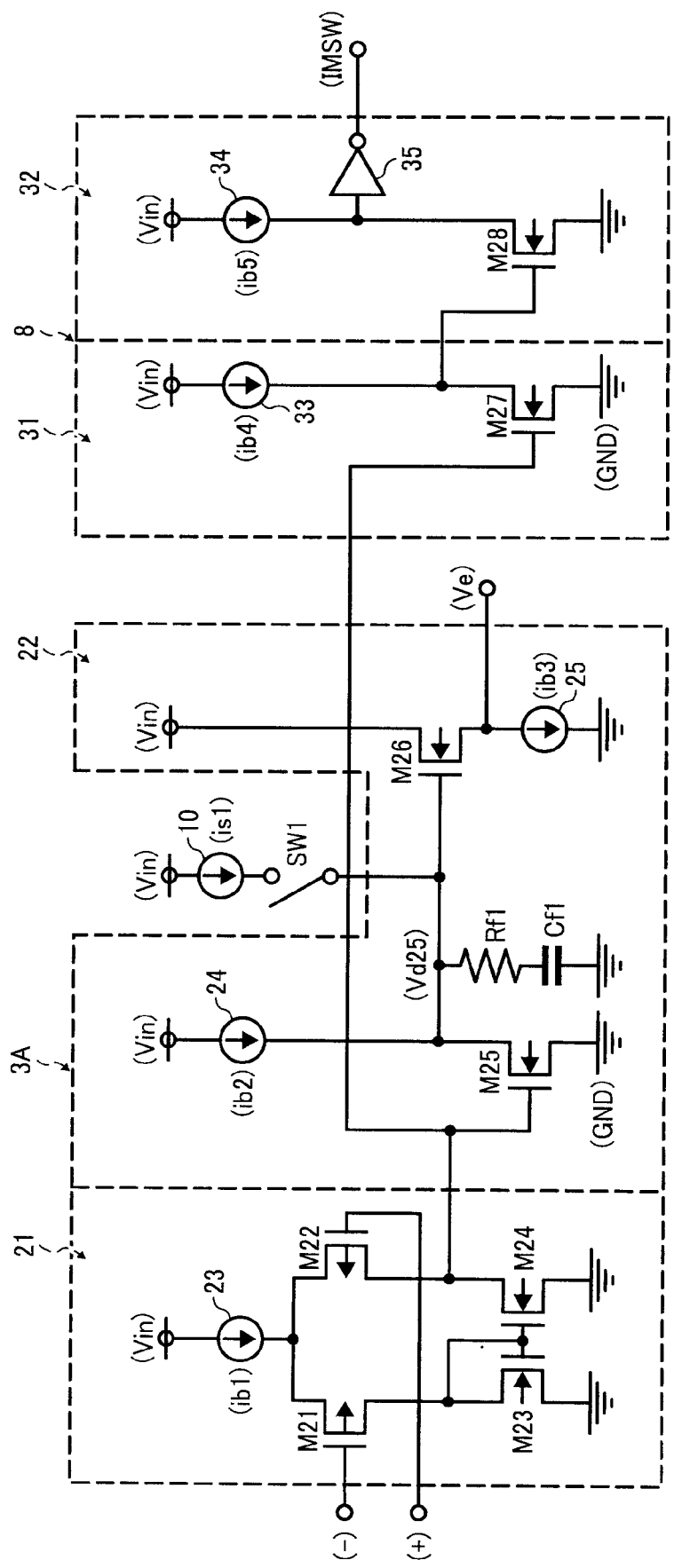
FIG. 6 illustrates another example of circuitry of the switching regulator shown in FIG. 1.

FIG. 6 illustrates an example of circuitry of a differential amplifier 3A. It is to be noted that, in FIG. 6, elements identical or similar to those shown in FIGS. 1 and 4 are given identical reference characters, and thus descriptions thereof are omitted.

The configuration shown in FIG. 6 is different from that shown in FIGS. 1 and 3 in that the serial circuit including the constant current source 10 and the switch SW1 shown in FIG. 1 is connected between the input voltage Vin and the gate of the NMOS transistor M26 shown in FIG. 3.

In FIG. 6, when the signal IMSW output from the voltage change detection circuit 8 rises to high, the switch SW turns on, and thus the constant current source 10 is connected in parallel to the constant current source 24, which increases a drain current of the NMOS transistor M25, and thus a drain voltage Vd25 increases. Consequently, a gate voltage of the NMOS transistor M26 serving as the source follower circuit increases, and accordingly the differential voltage Ve output from the differential amplifier 3A increases.

By applying the configuration shown in FIG. 5 to the constant current source 10 shown in FIG. 6, the differential voltage Ve output from the differential amplifier 3A can correspond to the voltage output from the signal amplifier unit 31.

Thus, the differential voltage Ve can be increased by a predetermined amount by changing the voltage output from the amplifier unit 22 of the differential amplifier as well as directly increasing the voltage at the output terminal of the differential amplifier when the voltage change detection circuit 8 detects a decrease in the output voltage Vout and turns the signal IMSW to high.

As described above, in the present embodiment, because the switching regulator 1 includes the voltage change detection circuit 8, a decrease in the output voltage can be promptly detected. Further, when the output current iout significantly increases and thus the decrease in the output voltage Vout exceeds the first reference amount, the switching regulator 1 promptly turns on the switching transistor M1 or changes the voltage output from the voltage change detection circuit 8 so as to turn on the switching transistor M1 regardless of the clock signal CLK output from the oscillation circuit 6. Accordingly, the output voltage Vout can be immediately increased so as to compensate for the decrease, preventing a significant decrease in the output voltage Vout.

Further, when the signal IMSW rises to high, the switch SW1 is turned on so that the constant current source 10 can supply the constant current is1 to either the output terminal of the differential amplifier 3 or the amplifier unit 22 thereof, which immediately increases the differential voltage Ve output from the differential amplifier 3. Thus, the response speed of the differential amplifier 3 can be accelerated, and the switching transistor M1 can be kept on for a longer time period, better preventing the output voltage Vout from decreasing.

Moreover, when the current detection voltage Vi, which is converted from the inductor current iL flowing through the inductor L1, exceeds the differential voltage Ve output from the differential amplifier 3, the detection result generated by the voltage change detection circuit 8 is disabled. Thus, while the load is in normal operation, and accordingly the switching regulator has a relatively high clock frequency and can respond promptly, the voltage output from the differential amplifier is not caused to fluctuate, securing reliable operation.

Another embodiment of the present invention is described below with reference to FIG. 7.

In the embodiments described with reference to FIGS. 1 through 6, after detecting the decrease in the output voltage Vout and turning the signal IMSW to high, the voltage difference detection circuit 8 keeps the signal IMSW high until the output voltage Vout is stabilized. Alternatively, after the voltage difference detection circuit 8 detects the decrease in the output voltage Vout and then raises the signal IMSW to high, the signal IMSW can be shifted to low when the clock signal CLK turns to high, which is a distinctive feature of the present embodiment.

Figure 7:
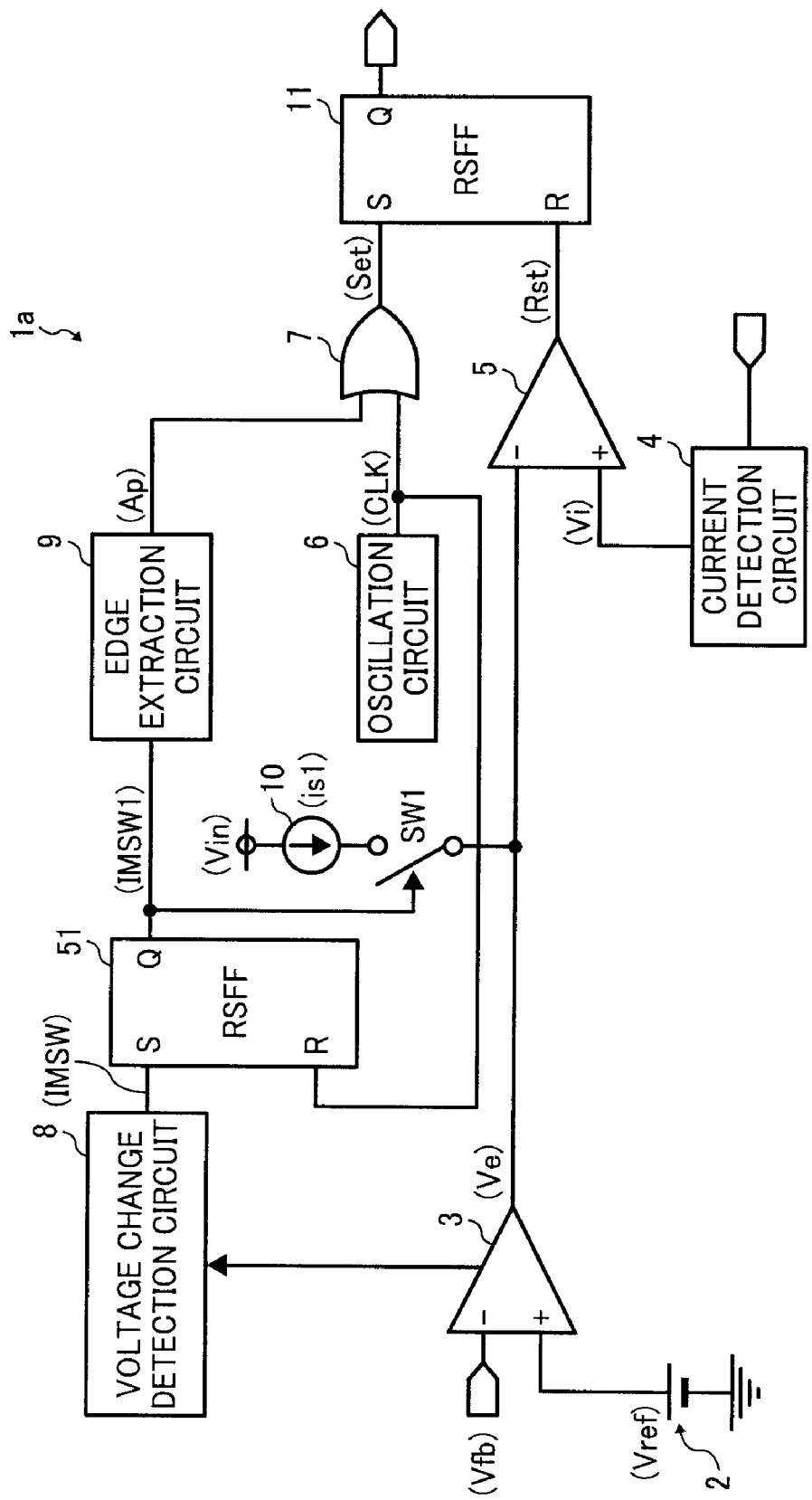
FIG. 7 illustrates an example of circuitry of a switching regulator according to another illustrative embodiment.

FIG. 7 illustrates an example of circuitry of a switching regulator 1a according to the present embodiment.

It is to be noted that elements shown in FIG. 7 that are given identical reference characters to those shown in FIG. 1 have a configuration identical or similar thereto, and thus descriptions thereof are omitted.

The switching regulator 1a shown in FIG. 7 is different from the switching regulator shown 1 in FIG. 1 in that a RS flip-flop circuit 51 is added to the elements included in the switching regulator 1.

The switching regulator 1a includes a reference voltage generation circuit 2, a differential amplifier 3, a current detection circuit 4, a comparator 5, an oscillation circuit 6, an OR circuit 7, a voltage change detection circuit 8, an edge extraction circuit 9, a constant current voltage 10, a switch SW1, and a RS flip-flop circuit 11.

It is to be noted that, although the switching regulator 1a further includes a switching transistor M1, a synchronous rectification transistor M2, an inductor L1 an output capacitor C1, resistors R1 and R2, an inverter 12, and a load 20 similarly to the switching regulator 1 shown in FIG. 1, they are not shown in FIG. 7 for simplicity.

The switching regulator 1a is a current-mode control type step-down switching regulator that steps down an input voltage Vin input to an input terminal IN to a predetermined or given constant voltage, and outputs an output voltage Vout from an output terminal OUT to the load 20. The RS flip-flop circuit 51 is reset with a clock signal CLK output from the oscillation circuit 6.

The current detection circuit 4, the comparator 5, the oscillation circuit 6, the OR circuit 7, the edge extraction circuit 9, the RS flip-flop circuits 11 and 51, and the inverter 12 serve as a control circuit.

It is to be noted that the respective circuits of the switching regulator 1a except the inductor L1 and the capacitor C1 can be integrated into an integrated circuit (IC). Alternatively, the respective circuits of the switching regulator 1a except at least one of the switching transistor M1, the synchronous rectification transistor M2, the inductor L1, and the output capacitor C1 can be integrated into an IC.

In the RS flip-flop circuit 51, a set input terminal S receives a signal IMSW output from the voltage change detection circuit 8, a reset input terminal R receives the clock signal CLK, and a non-inversion output terminal Q outputs a signal IMSW1 to both a control electrode of the switch SW1 and an input terminal of the edge extraction circuit 9. Thus, the signal IMSW1 in the present embodiment corresponds to the signal IMSW in the switching regulator 1 shown in FIG. 1.

Operation of the switching regulator 1a is described below with reference to FIGS. 7 and 8.

Figure 8:
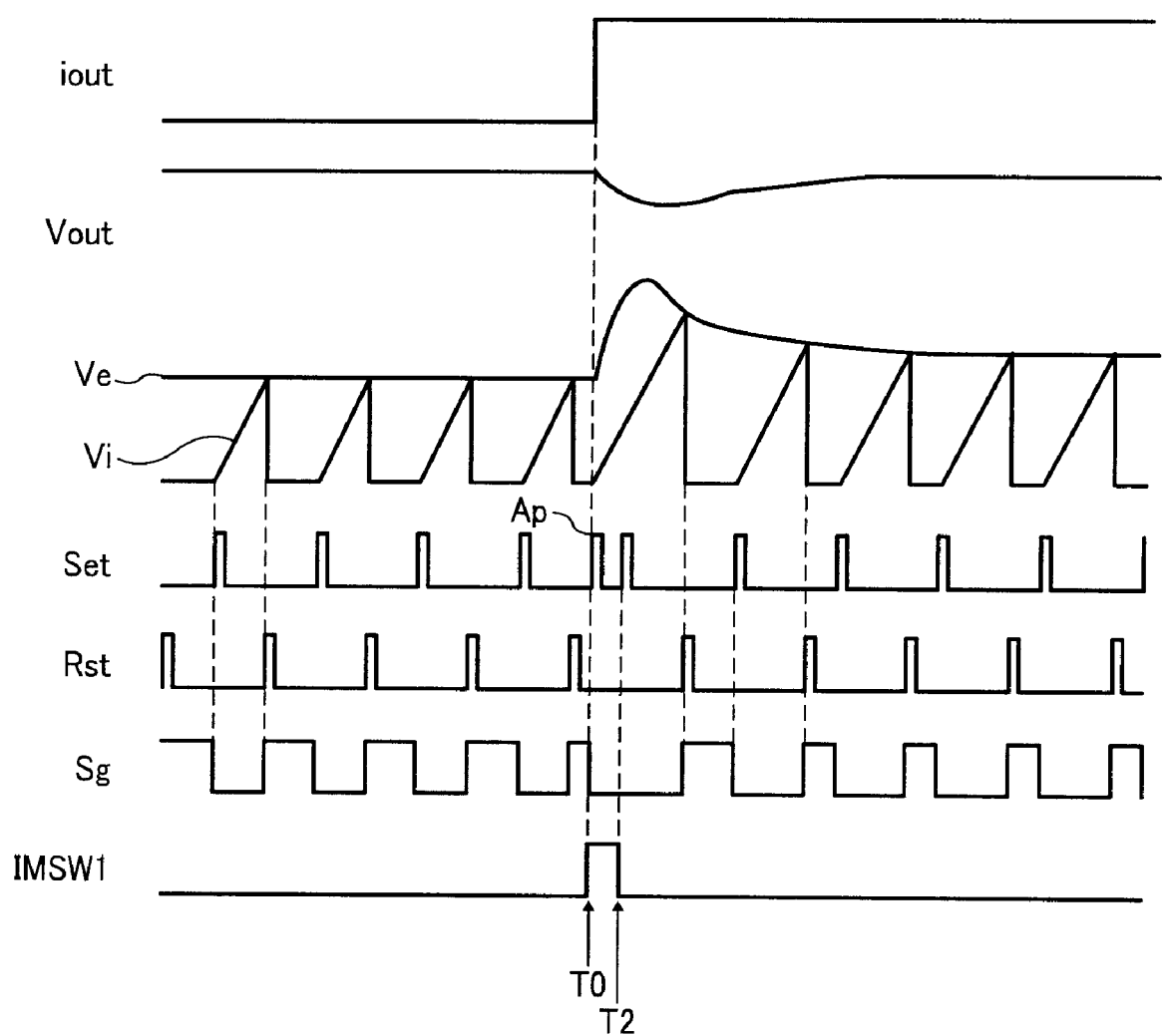
FIG. 8 is a timing chart illustrating examples of waves of respective signals generated in the switching regulator shown in FIG. 7.

FIG. 8 is a timing chart illustrating respective signals generated in the switching regulator 1a shown in FIG. 7.

At a time point T0 shown in FIG. 8, when the output voltage Vout decreases, and the signal IMSW output from the voltage change detection circuit 8 rises to high, the RS flop-flop circuit 51 is set, and thus the signal IMSW1 output therefrom rises to high.

When the signal IMSW1 output from the RS flip-flop circuit 51 thus rises to high, the edge extraction circuit 9 outputs a high level pulse signal Ap similarly to the switching regulator 1 shown in FIG. 1, setting the RS flip-flop circuit 11 via the OR circuit 7. Thus, the switching transistor M1 is turned on and the synchronous rectification transistor M2 is turned off. Further, when the signal IMSW1 rises to high, the switch SW1 is turned on, and accordingly the constant current source 10 supplies a constant current is1 to an output terminal of the differential amplifier 3, increasing a differential voltage Ve output from the differential amplifier 3.

The RS flip-flop circuit 51 is reset when the clock signal CLK output from the oscillation circuit 6 rises to high after the RS flip-flop circuit 51 is set. Thus, as shown in FIG. 8, the signal IMSW1 rises to high at the time point T0 and shifts to low at a time point T2.

As described above, in the switching regulator 1*a* according to the present embodiment, the RS flip-flop circuit 51 that is set with the signal IMSW output from the voltage change detection circuit 8 and reset with the clock signal CLK output from the oscillation circuit 6 is added to the switching regulator 1 shown in FIG. 1. Consequently, the switching regulator 1*a* can achieve effects similar to those obtained in the embodiments described with reference to FIGS. 1 through 6.

Another embodiment of the present invention is described below with reference to FIGS. 9 and 10.

Although the RS flip-flop circuit 51 is reset with the clock signal CLK in the embodiment described with reference to FIGS. 7 and 8, alternatively, the RS flip-flop circuit 51 can be reset according to changes in the differential voltage Ve, which is a distinctive feature of the present embodiment.

Figure 9:
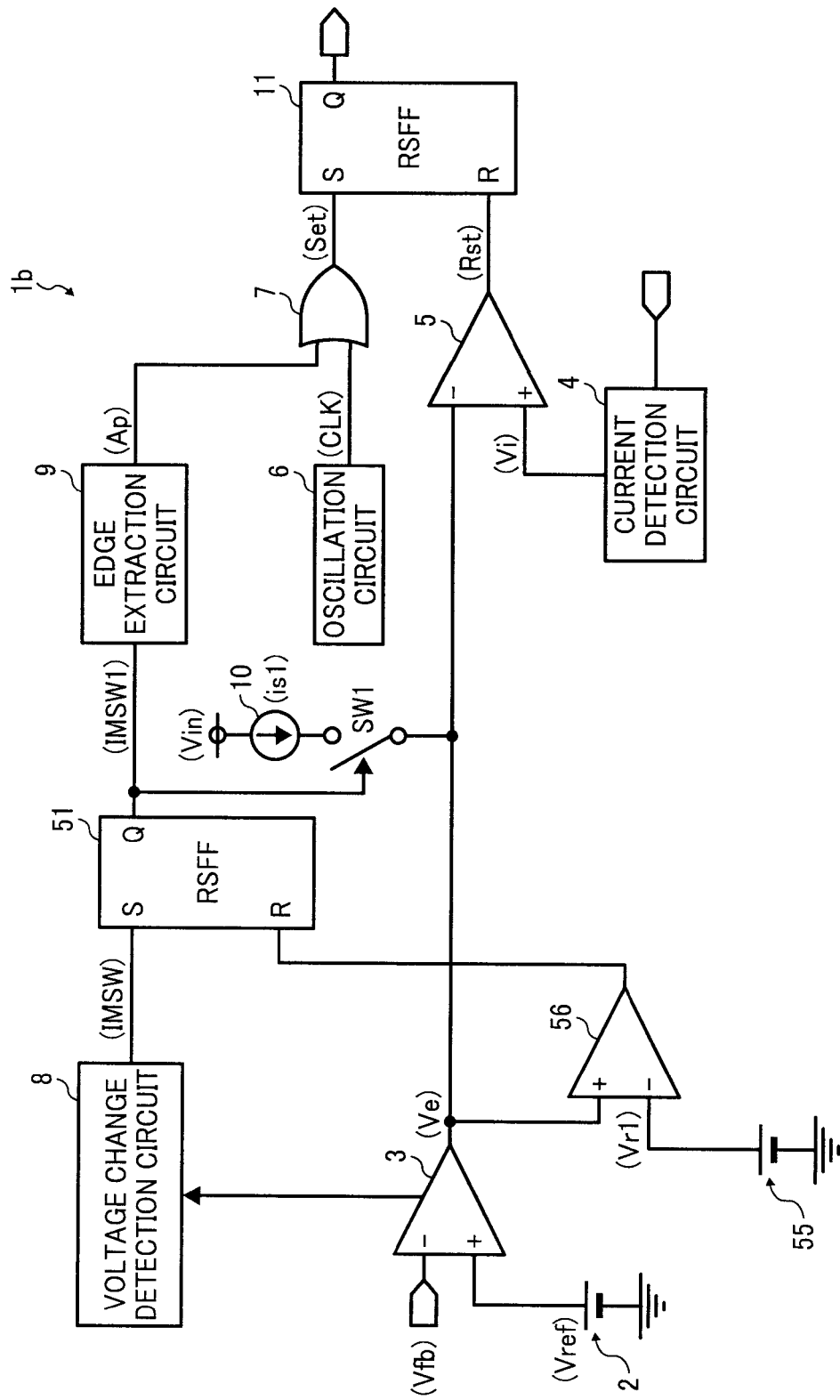
FIG. 9 illustrates an example of circuitry of a switching regulator according to another illustrative embodiment.

FIG. 9 illustrates an example of circuitry of a switching regulator 1*b* according to the present embodiment.

It is to be noted that elements shown in FIG. 9 that are given identical reference characters to those shown in FIG. 7 have a configuration identical or similar thereto, and thus descriptions thereof are omitted.

Differently from the switching regulator 1*a* shown in FIG. 7, the switching regulator 1*b* shown in FIG. 9 includes a reference voltage generation circuit 55 that generates and outputs a reference voltage Vr1, and a comparator 56 in addition to the elements included in the switching regulator 1*a* shown in 7. The reference voltage Vr1 serves as a second reference voltage.

In addition to the reference voltage generation circuit 55 and the comparator 56, the switching regulator 1*b* includes a reference voltage generation circuit 2, a differential amplifier 3, a current detection circuit 4, a comparator 5, an oscillation circuit 6, an OR circuit 7, a voltage change detection circuit 8, an edge extraction circuit 9, a constant current voltage 10, a switch SW1, and RS flip-flop circuits 11 and 51, similarly to the switching regulator 1*a* shown in FIG. 7.

It is to be noted that, although the switching regulator 1*b* further includes a switching transistor M1, a synchronous rectification transistor M2, an inductor L1, an output capacitor C1, resistors R1 and R2, an inverter 12, and a load 20 similarly to the switching regulator 1 shown in FIG. 1, they are not shown in FIG. 9 for simplicity.

The switching regulator 1*b* is a current-mode control type step-down switching regulator that steps down an input voltage Vin input to an input terminal IN to a predetermined or given constant voltage, and outputs an output voltage Vout from an output terminal OUT to the load 20.

The current detection circuit 4, the comparators 5 and 56, the oscillation circuit 6, the OR circuit 7, the edge extraction circuit 9, the RS flip-flop circuits 11 and 51, the inverter 12, and the reference voltage generation circuit 55 serve as a control circuit.

It is to be noted that the respective circuits of the switching regulator 1*b* except the inductor L1 and the capacitor C1 can be integrated into an integrated circuit (IC). Alternatively, the respective circuits of the switching regulator 1*b* except at least one of the switching transistor M1, the synchronous rectification transistor M2, the inductor L1, and the output capacitor C1 can be integrated into an IC.

In the comparator 56, a non-inversion input terminal receives the differential voltage Ve, an inversion input terminal receives the reference voltage Vr1 output from the reference voltage generation circuit 55, and an output terminal is connected to a reset input terminal R of the RS flip-flop circuit 51.

Operation of the switching regulator 1*b* is described below with reference to FIGS. 9 and 10.

Figure 10:
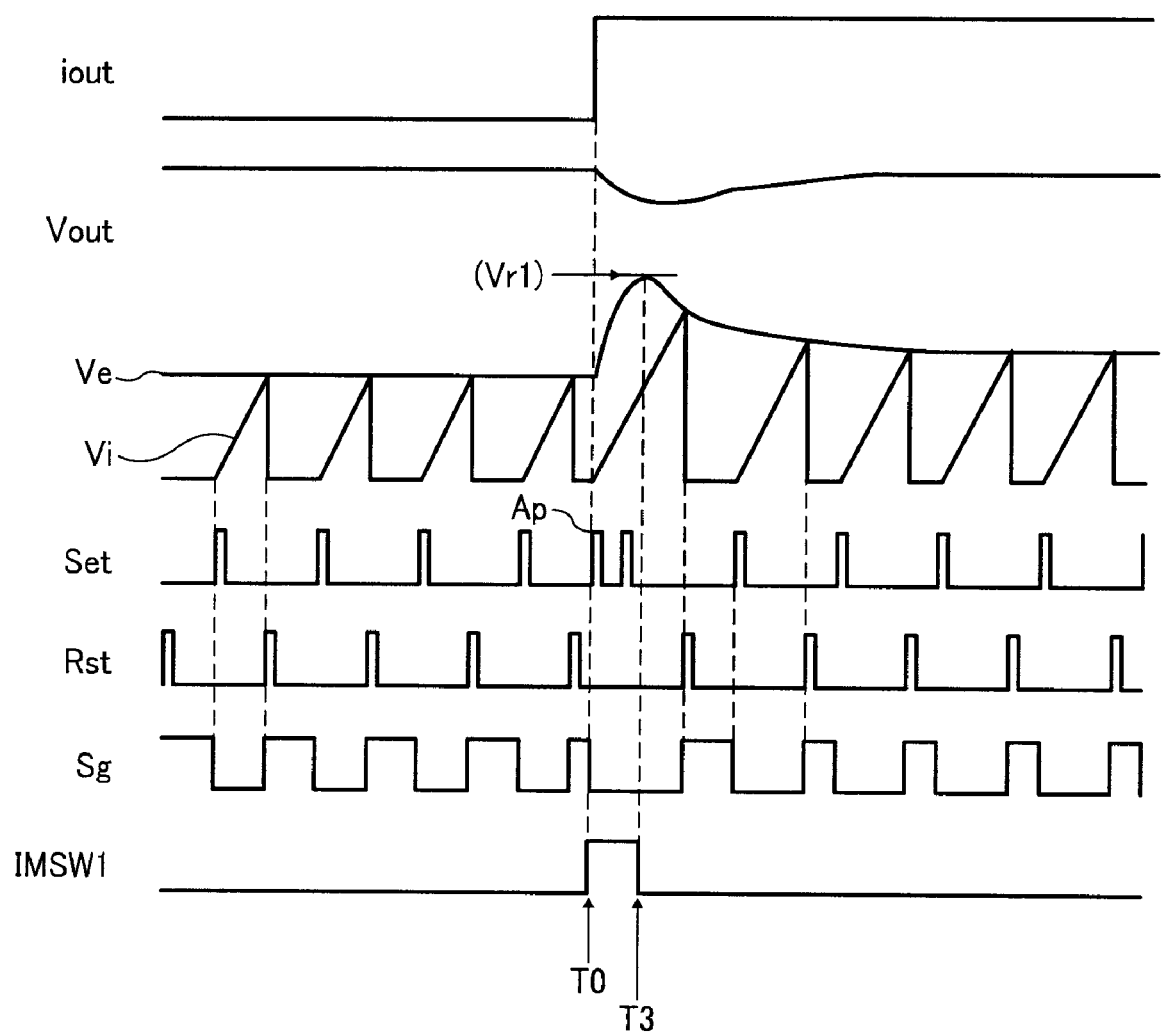
FIG. 10 is a timing chart illustrating examples of waves of respective signals generated in the switching regulator shown in FIG. 9.

FIG. 10 is a timing chart illustrating respective signals generated in the switching regulator 1*b* shown in FIG. 9.

At a time point T0 shown in FIG. 10, when the output voltage Vout decreases, and the signal IMSW output from the voltage change detection circuit 8 rises to high, the RS flop-flop circuit 51 is set, and thus the signal IMSW1 output therefrom rises to high.

When the signal IMSW1 output from the RS flip-flop circuit 51 thus rises to high, the edge extraction circuit 9 outputs a high level pulse signal Ap similarly to that in the switching regulator 1 shown in FIG. 1, simultaneously turning on the switching transistor M1 and turning off the synchronous rectification transistor M2. Further, the differential voltage Ve output from the differential amplifier 3 is increased.

When the differential voltage Ve exceeds the reference voltage Vr1, the comparator 56 turns its output terminal high, resetting the RS flip-flop circuit 51. Thus, as shown in FIG. 10, the signal IMSW1 that has risen to high at the time point T0 shifts to low at a time point T3.

As described above, the switching regulator 1*b* according to the present embodiment includes the RS flip-flop circuit 51 that is set with the signal IMSW output from the voltage change detection circuit 8 and reset with the signal output from the comparator 56, that is, the differential voltage Ve, in addition to the elements included in the switching regulator 1 shown in FIG. 1. Consequently, the switching regulator 1*b* can achieve effects similar to those obtained in the embodiments described with reference to FIGS. 1 through 6.

Another embodiment of the present invention is described below with reference to FIG. 11.

The RS flip-flop circuit 51 used in the embodiment described with reference to FIGS. 9 and 10 can be replaced with an AND circuit, which is a distinctive feature of the present embodiment.

Figure 11:
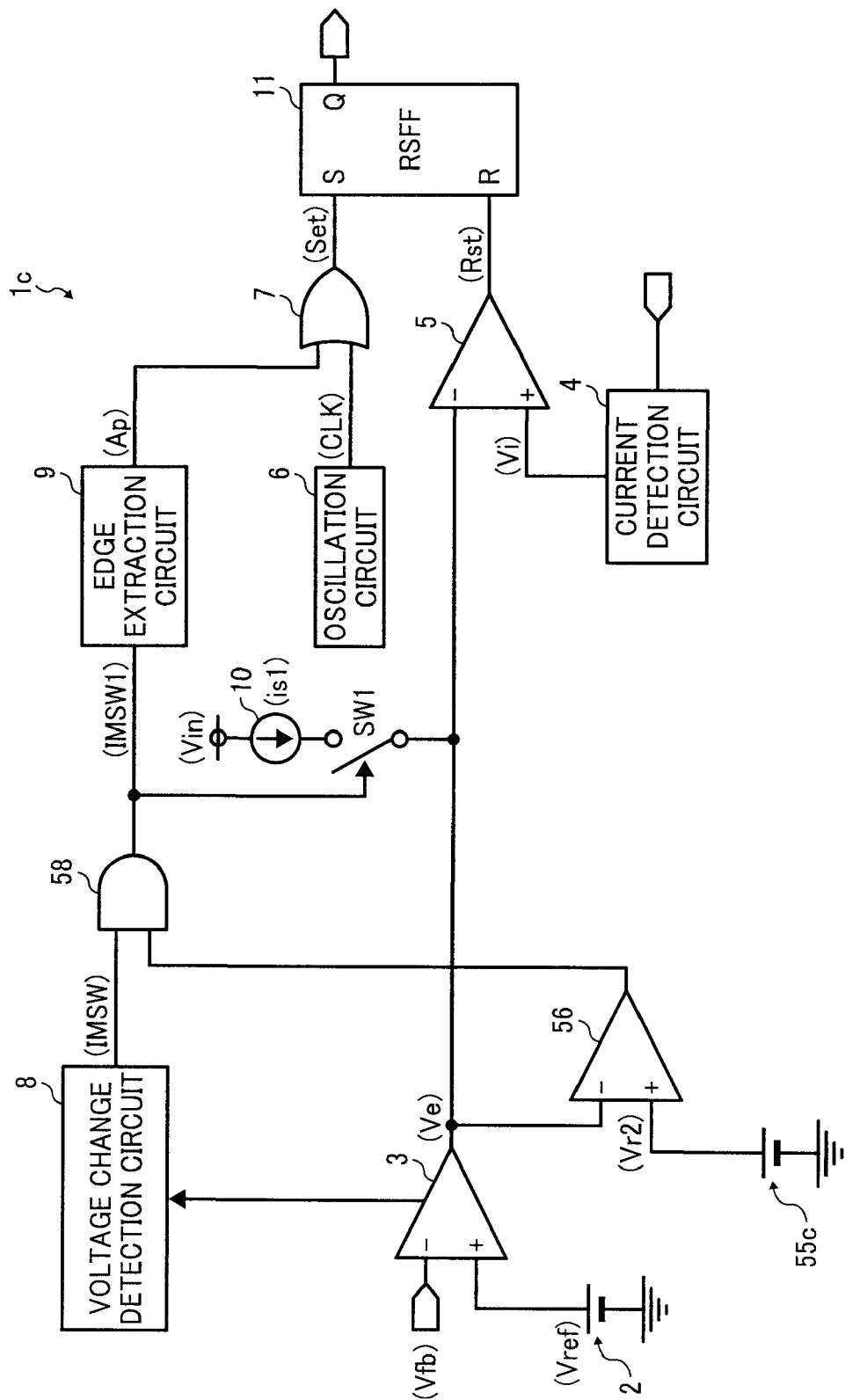
FIG. 11 illustrates an example of circuitry of a switching regulator according to another illustrative embodiment.
Figure 12:
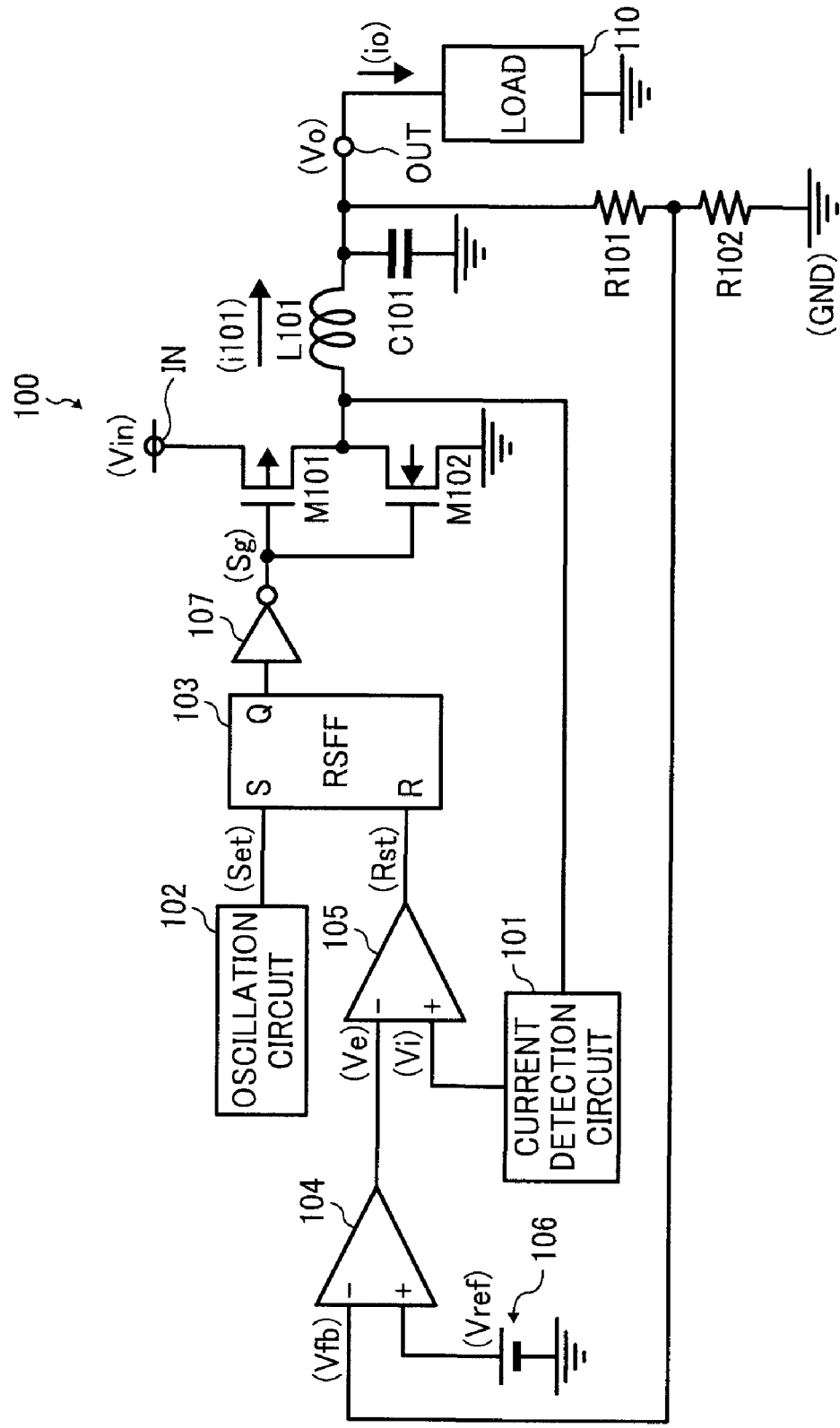
FIG. 12 illustrates an example of circuitry of a related-art switching regulator.
Figure 13:
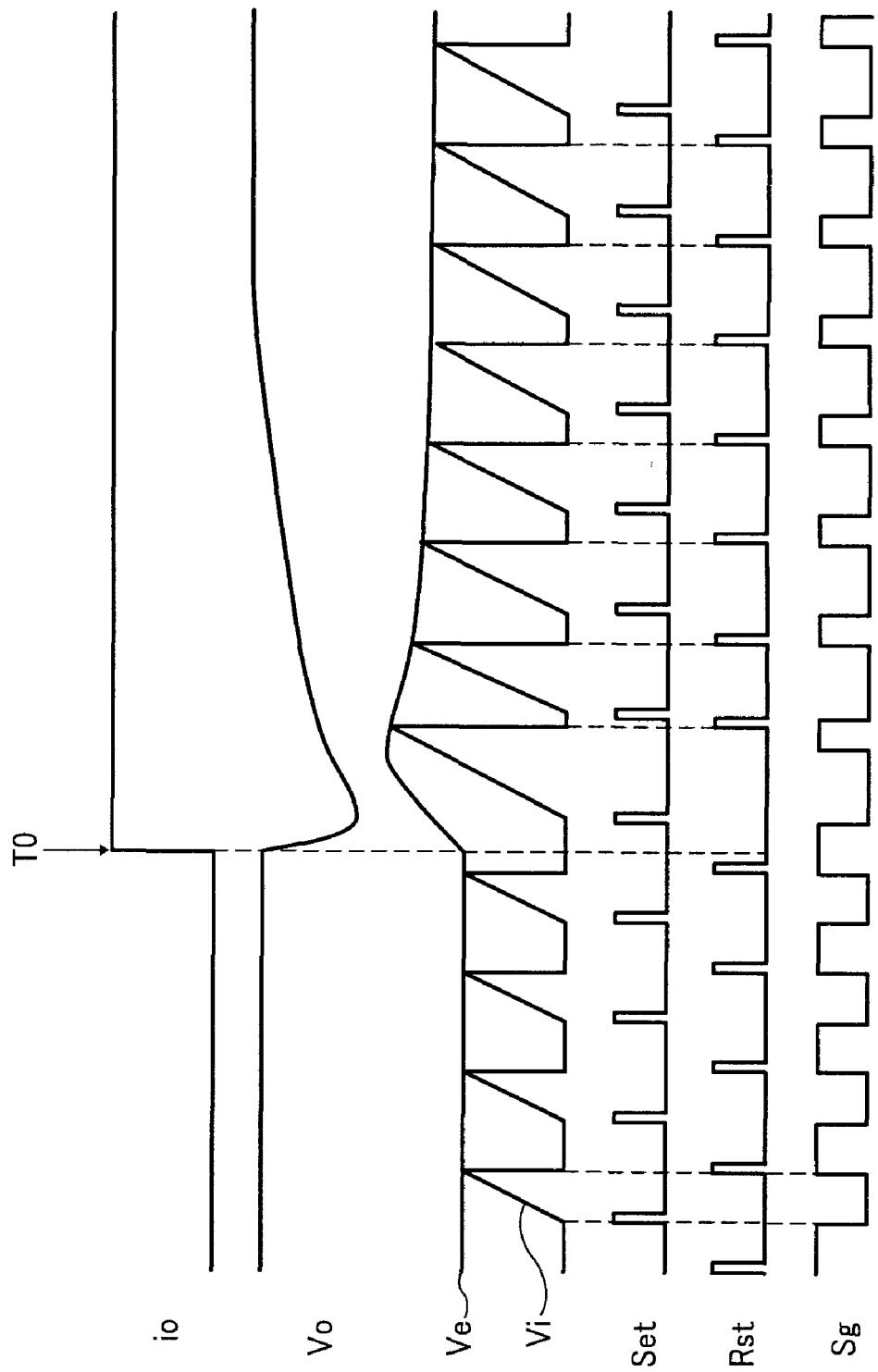
FIG. 13 is a timing chart illustrating examples of waves of respective signals generated in the switching regulator shown in FIG. 12.

FIG. 11 illustrates an example of circuitry of a switching regulator 1*c* according to the present embodiment.

It is to be noted that elements shown in FIG. 11 that are given identical reference characters to those shown in FIG. 9 have a configuration identical or similar thereto, and thus descriptions thereof are omitted.

The switching regulator 1*c* shown in FIG. 11 is different from the switching regulator 1*b* shown in FIG. 9 in that the RS flop-flop circuit 51 shown in FIG. 9 is replaced with an AND circuit 58, and the reference voltage Vr1 shown in FIG. 11 is replace with a reference voltage Vr2 that is a reference value of a differential voltage Ve when an output current iout is at a third predetermined or given reference value or greater. The reference voltage Vr2 serves as a second reference value, and the reference voltage generation circuit 55 shown in FIG. 9 is replaced with a reference voltage generation circuit 55c.

In addition to the AND circuit 58 and the reference voltage generation circuit 55c, the switching regulator 1c includes a reference voltage generation circuit 2, a differential amplifier 3, a current detection circuit 4, comparators 5 and 56, an oscillation circuit 6, an OR circuit 7, a voltage change detection circuit 8, an edge extraction circuit 9, a constant current voltage 10, a switch SW1, and a RS flip-flop circuit 11, similarly to the switching regulator 1b shown in FIG. 9.

It is to be noted that, although the switching regulator 1c further includes a switching transistor M1, a synchronous, rectification transistor M2, an inductor-L1, an output capacitor C1, resistors R1 and R2, an inverter 12, and a load 20 similarly to the switching regulator 1 shown in FIG. 1, they are not shown in FIG. 11 for simplicity.

The switching regulator 1c is a current-mode control type step-down switching regulator that steps down an input voltage Vin input to an input terminal IN to a predetermined or given constant voltage, and outputs an output voltage Vout from an output terminal OUT to the load 20.

The current detection circuit 4, the comparators 5 and 56, the oscillation circuit 6, the OR circuit 7, the edge extraction circuit 9, the RS flip-flop circuit 11, the inverter 12, the reference voltage generation circuit 55c, and the AND circuit 58 serve as a control circuit.

It is to be noted that the respective circuits of the switching regulator 1c except the inductor L1 and the capacitor C1 can be integrated into an integrated circuit (IC). Alternatively, the respective circuits of the switching regulator 1c except at least one of the switching transistor M1, the synchronous rectification transistor M2, the inductor L1, and the output capacitor C1 can be integrated into an IC.

In the comparator 56, an inversion input terminal receives the differential voltage Ve, a non-inversion input terminal receives the reference voltage Vr2 output from the reference voltage generation circuit 55c, and an output terminal is connected to one of input terminals of the AND circuit 58. The other input terminal thereof receives a signal IMSW output from the voltage change detection circuit 8, and the AND circuit 58 outputs a signal IMSW1 to control electrodes of both the edge extraction circuit 9 and the switch SW1.

In the configuration described above, when the differential voltage Ve is not less than the reference voltage Vr2 (Ve≧Vr2), the comparator 56 outputs a low level signal to the AND circuit 58, and thus the signal IMSW1 output from the AND circuit 58 is low. Consequently, even when the output voltage Vout decreases and the voltage change detection circuit 8 outputs a high level signal IMSW, the level of the IMSW1 output from the AND circuit 58 is kept low while the differential voltage Ve is not less than the reference voltage Vr2.

Thus, the operation of the voltage change detection circuit 8 can be ignored while the differential voltage Ve is not less than the reference voltage Vr2. That is, by setting the reference voltage Vr2 identical to the value of the differential voltage Ve when the output current iout is at the third reference value, the signal IMSW output from the voltage change detection circuit 8 is effective to control the switching transistor M1, the synchronous rectification transistor M2, and the differential voltage Ve only when the output current iout is less than the third reference value.

For example, by setting the third reference value, at which the comparator 56 shifts the level of the signal, to a value between a current value when the load 20 is in a standby state and a lowest current value during normal operation, the signal IMSW output from the voltage change detection circuit 8 can be effective only when the load 20 starts up from the standby state.

As described above, the switching regulator 1c according to the present embodiment uses the AND circuit 58 instead of the RS flip-flop circuit 51 included in the switching regulator 1b shown in FIG. 9. Consequently, the switching regulator 1c can achieve effects similar to those obtained in the embodiment described with reference to FIGS. 9 through 10.

Further, because the variable voltage added to the differential voltage Ve is determined according to the signal (voltage Vd27) output from the signal amplifier circuit 31 of the voltage change detection circuit 8 shown in FIG. 5, the variable voltage can be controlled within a preferred range.

In addition, the signal IMSW output from the voltage change detection circuit 8 can be ignored while the output current iout is greater than the third reference value. Consequently, while the load 20 is in normal operation and the switching regulator has a relatively high clock frequency and can respond relatively quickly, the differential voltage Ve is not unnecessarily changed, securing reliable operation.

It is to be noted that the present invention can be applied to an asynchronous rectification switching transistor as well, although the embodiments described above concerns synchronous rectification switching transistors. In the case of an asynchronous rectification switching transistor, the synchronous rectification transistor M2 can be replaced with a diode, and its cathode is connected to the drain of the switching transistor M1 and its anode is connected to a ground voltage. The diode serves as a rectification element.

Further, in the embodiments described above, the amplifier unit 22 (second stage) of the differential amplifier 3 is not restricted to the example shown in FIG. 3, and an amplifier unit including at least one amplifier circuit can be used.

Moreover, although the description above concerns examples in which the differential voltage Ve is increased when the signal IMSW output from the voltage change detection circuit 8 rises to high, alternatively, the switching regulator can be configured so as to turn on the switching transistor M1 by decreasing the differential voltage Ve corresponding to the signal IMSW when the voltage change detection circuit 8 detects that the decrease in the output voltage Vout is identical to or greater than the predetermined value.

Further, although the description above concerns examples in which the time period during which the switching transistor M1 is kept on is controlled according to the signal output from the RS flip-flop circuit, alternatively, a time period during which the switching transistor M1 is kept off can be controlled according to the clock signal CLK.

Numerous additional modifications and variations are possible in light of the above teachings. It is therefore to be understood that, within the scope of the appended claims, the disclosure of this patent specification may be practiced otherwise than as specifically described herein.

What is claimed is:

1. A switching regulator that converts a voltage input to an input terminal thereof to a predetermined constant voltage and outputs an output voltage from an output terminal, the switching regulator comprising:
   a switching element configured to switch between on and off according to a control signal;
   an inductor configured to be charged with the input voltage by switching of the switching element;
   a rectification element configured to discharge the inductor when the switching element is off and charging the inductor is stopped;

a differential amplifier configured to amplify a difference between a voltage proportional to the output voltage and a predetermined reference voltage;

a voltage change detection circuit configured to detect changes in the output voltage;

a control circuit configured to control a time period during which the switching element is on or off by causing the switching element to switch between on and off in a predetermined cycle depending on a voltage output from the differential amplifier, the control circuit configured to turn on the switching element regardless of the predetermined cycle when the voltage change detection circuit detects that a decrease in the output voltage exceeds a predetermined first reference value; and an ancillary circuit that causes the switching element to turn on by adjusting the voltage output from the differential amplifier when the voltage change detection circuit detects that the decrease in the output voltage exceeds the first reference value, wherein the voltage change detection circuit comprises:
    a signal amplifier unit configured to amplify a signal output from the differential amplifier and output the amplified signal; and
    a binarization unit configured to binarize the amplified signal output the signal amplifier unit, and wherein the ancillary circuit comprises:
    a constant current source configured to supply a constant electrical current; and
    a switch member connected in series to the constant current source and configured to output the constant electrical current supplied from the constant current source to an output terminal of the differential amplifier according to a signal output from the voltage change detection circuit, wherein when the voltage change detection circuit inputs a signal indicating that the decrease in the output voltage exceeds the first reference value thereto, the switch member causes the constant current source to output the constant electrical current to the output terminal of the differential amplifier, and the constant current supplied by the constant current source of the ancillary circuit has a current value corresponding to a voltage output from the signal amplifier unit of the voltage change detection circuit.

2. The switching regulator according to claim 1, wherein the differential amplifier comprises:
a differential unit including a first input terminal to which the voltage proportional to the output voltage is input and a second input terminal to which the reference voltage is input; and
an amplifier unit including at least one amplifier circuit configured to amplify a signal output from the differential unit, and
the voltage change detection circuit detects changes in the output voltage based on the signal output from the differential unit.

3. The switching regulator according to claim 2, wherein a gain of the signal amplifier unit of the voltage change detection circuit is smaller than that of the amplifier unit of the differential amplifier.

4. The switching regulator according to claim 3, wherein the signal amplifier unit of the voltage change detection circuit has a response speed faster than that of the differential amplifier, and a slew rate of the signal output from the signal amplifier unit is greater than that of the signal output from the differential amplifier.

5. The switching regulator according to claim 1, wherein the differential amplifier comprises:
a differential unit including a first input terminal to which the voltage proportional to the output voltage is input and a second input terminal to which the reference voltage is input; and
an amplifier unit including at least one amplifier circuit configured to amplify a signal output from the differential unit, and
when the voltage change detection circuit detects that the decrease in the output voltage exceeds the first reference value, the ancillary circuit changes the voltage output from the differential amplifier by an amount corresponding to a voltage output from the differential unit of the differential amplifier.

6. The switching regulator according to claim 1, wherein the control circuit performs an operation to turn on the switching element regardless of the predetermined cycle when the voltage change detection circuits outputs the signal indicating that the decrease in the output voltage exceeds the first reference value, synchronizes with the signal that causes the switching element to switch in the predetermined cycle, and cancels the operation to turn on the switching element regardless of the predetermined cycle.

7. The switching regulator according to claim 1, wherein the control circuit performs an operation to turn on the switching element regardless of the predetermined cycle when the voltage change detection circuits outputs the signal indicating that the decrease in the output voltage exceeds the first reference value, and cancels the operation to turn on the switching element regardless of the predetermined cycle when the output voltage exceeds a second reference value.

8. The switching regulator according to claim 7, wherein the control circuit detects an inductor current flowing through the inductor and cancels a detection result generated by the voltage change detection circuit when the inductor current exceeds a third reference value.

9. A switching regulator that converts an voltage input to an input terminal thereof to a predetermined constant voltage and outputs an output voltage from an output terminal, the switching regulator comprising:
a switching element configured to switch between on and off according to a control signal;
an inductor configured to the charged with the input voltage by switching of the switching element;
a rectification element configured to discharge the inductor when the switching element is off and charging the inductor s stopped;
a differential amplifier configured to amplify a difference between a voltage proportional to the output voltage and a predetermined reference voltage;
a voltage change detection circuit configured to detect changes in the output voltage;
a control circuit configured to control a time period during which the switching element is on or off by causing the switching element to switch between on and off in a predetermined cycle depending on a voltage output from the differential amplifier; and
an ancillary circuit that causes the switching element to turn on by adjusting the voltage output from the differential amplifier when the voltage change detection circuit detects that a decrease in the output voltage exceeds a first reference value wherein the voltage change detection circuit comprises:
: a signal amplifier unit configured to amplify a signal output from the differential amplifier and output the amplified signal; and
: a binarization unit configured to binarize the amplified signal output from the signal amplifier unit, and wherein the ancillary circuit comprises:
: a constant current source configured to supply a constant electrical current; and
: a switch member connected in series to the constant current source and configured to output the constant electrical current supplied from the constant current source to an output terminal of the differential amplifier according to a signal output from the voltage change detection circuit, wherein
: when the voltage change detection circuit inputs a signal indicating that the decrease in the output voltage exceeds the first reference value thereto, the switch member causes the constant current source to output the constant electrical current to the output terminal of the differential amplifier.

10. The switching regulator according to claim 9, wherein the differential amplifier comprises:
: a differential unit including a first input terminal to which the voltage proportional to the output voltage is input and a second input terminal to which the reference voltage is input; and
: an amplifier unit including at least one amplifier circuit configured to amplify a signal output from the differential unit, and
: the voltage change detection circuit detects changes in the output voltage based on the signal output from the differential unit.

11. The switching regulator according to claim 10, wherein a gain of the signal amplifier unit is smaller than that of the amplifier unit of the differential amplifier.

12. The switching regulator according to claim 11, wherein the signal amplifier unit of the voltage change detection circuit have a response speed faster than that of the differential amplifier, and
: a slew rate of the signal output from the signal amplifier unit s greater than that of the signal output from the differential amplifier.

13. The switching regulator according to claim 10, wherein the differential amplifier comprises;
: a differential unit including a first input terminal to which the voltage proportional to the output voltage is input and a second input terminal to which the reference voltage is input; and
: an amplifier unit including at least one amplifier circuit configured to amplify a signal output from the differential unit, and
: when the voltage change detection circuit detects that the decrease in the output voltage exceeds the first reference value, the ancillary circuit changes the voltage output from the differential amplifier with a voltage corresponding to a voltage output from the differential unit of the differential amplifier.

14. The switching regulator according to claim 13, wherein
: the constant current supplied by the constant current source has a current value corresponding to a voltage output from the signal amplifier unit of the voltage change detection circuit.

15. The switching regulator according to claim 9, wherein the control circuit performs an operation to turn on the switching element regardless of the predetermined cycle when the voltage change detection circuits outputs the signal indicating that the decrease in the output voltage exceeds the first reference value, synchronize with the signal that causes the switching element to switch in the predetermined cycle, and cancels the operation to turn on the switching element regardless of the predetermined.

16. The switching regulator according to claim 10, wherein the control circuit performs an operation to turn on the switching element regardless of the predetermined cycle when the voltage change detection circuits outputs the signal indicating that the decrease in the output voltage exceeds the first reference value, and cancels the operation to turn on the switching element regardless of the predetermined cycle when the output voltage exceeds a second reference value.

17. The switching regulator according to claim 1, wherein when the voltage change detection circuit detects the decrease in the output voltage, the control circuit turns on the switching element before the switching element is turned on according to the predetermined cycle.

18. The switching regulator according to claim 9, wherein when the voltage change detection circuit detects the decrease in the output voltage, the ancillary circuit increases the voltage output from the differential amplifier by supplying a constant current to the output terminal of the differential amplifier.

* * * * *